United States Patent
Mathiopoulos

(10) Patent No.: US 11,913,419 B1
(45) Date of Patent: Feb. 27, 2024

(54) UNDERWATER POWER GENERATOR

(71) Applicant: Kostantinos Mathiopoulos, Loomis, CA (US)

(72) Inventor: Kostantinos Mathiopoulos, Loomis, CA (US)

( * ) Notice: Subject to any disclaimer, the term of this patent is extended or adjusted under 35 U.S.C. 154(b) by 0 days.

(21) Appl. No.: 18/142,556

(22) Filed: May 2, 2023

Related U.S. Application Data

(60) Provisional application No. 63/416,437, filed on Oct. 14, 2022, provisional application No. 63/412,171, filed on Sep. 30, 2022.

(51) Int. Cl.
*F03B 13/00* (2006.01)

(52) U.S. Cl.
CPC ........ *F03B 13/00* (2013.01); *F05B 2220/706* (2013.01)

(58) Field of Classification Search
CPC .............................. F03B 13/00; F05B 2220/706
See application file for complete search history.

(56) References Cited

U.S. PATENT DOCUMENTS

2015/0211381 A1* 7/2015 Torrent .................. H02K 53/00
290/1 A

FOREIGN PATENT DOCUMENTS

WO WO-2005003551 A1 * 1/2005 .............. F03B 17/04

* cited by examiner

*Primary Examiner* — Viet P Nguyen

(57) ABSTRACT

A power generator is disclosed that generates power using the buoyancy of air rising in water. A plurality of air bags are connected to a chain which in turn is connected to a system of gears. An air compressor inflates air bags as they are rotating up to the surface of the water around the chain. The buoyancy of the air bags causes the chain to rotate the gear system which transforms rotational energy into electrical energy by a generator. The air bags are deflated before re-entering the water, and are then re-inflated upon rotating up towards the surface again.

4 Claims, 3 Drawing Sheets

UNDERWATER POWER GENERATOR

CROSS-REFERENCE TO RELATED APPLICATIONS

This application claims the priority and benefit of U.S. Provisional application Ser. No. 63/412,171, filed Sep. 30, 2022, and U.S. Provisional application Ser. No. 63/416,437, filed Oct. 14, 2022, each incorporated by reference in their entirety as though fully set forth herein.

FIELD OF THE INVENTION

The present invention generally relates to power generation, and in particular, a power generator is disclosed that generates power using the buoyancy of air rising in water.

BACKGROUND

This disclosure is directed towards various embodiments related to an underwater system for generating power. Numerous other types of generators, air producing apparatuses, and conveyors exist in the prior art. While these systems may be suitable for the purposes for which they were designed, they would not be as suitable for the purposes of the present invention, as hereinafter described.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figures 1, 2:
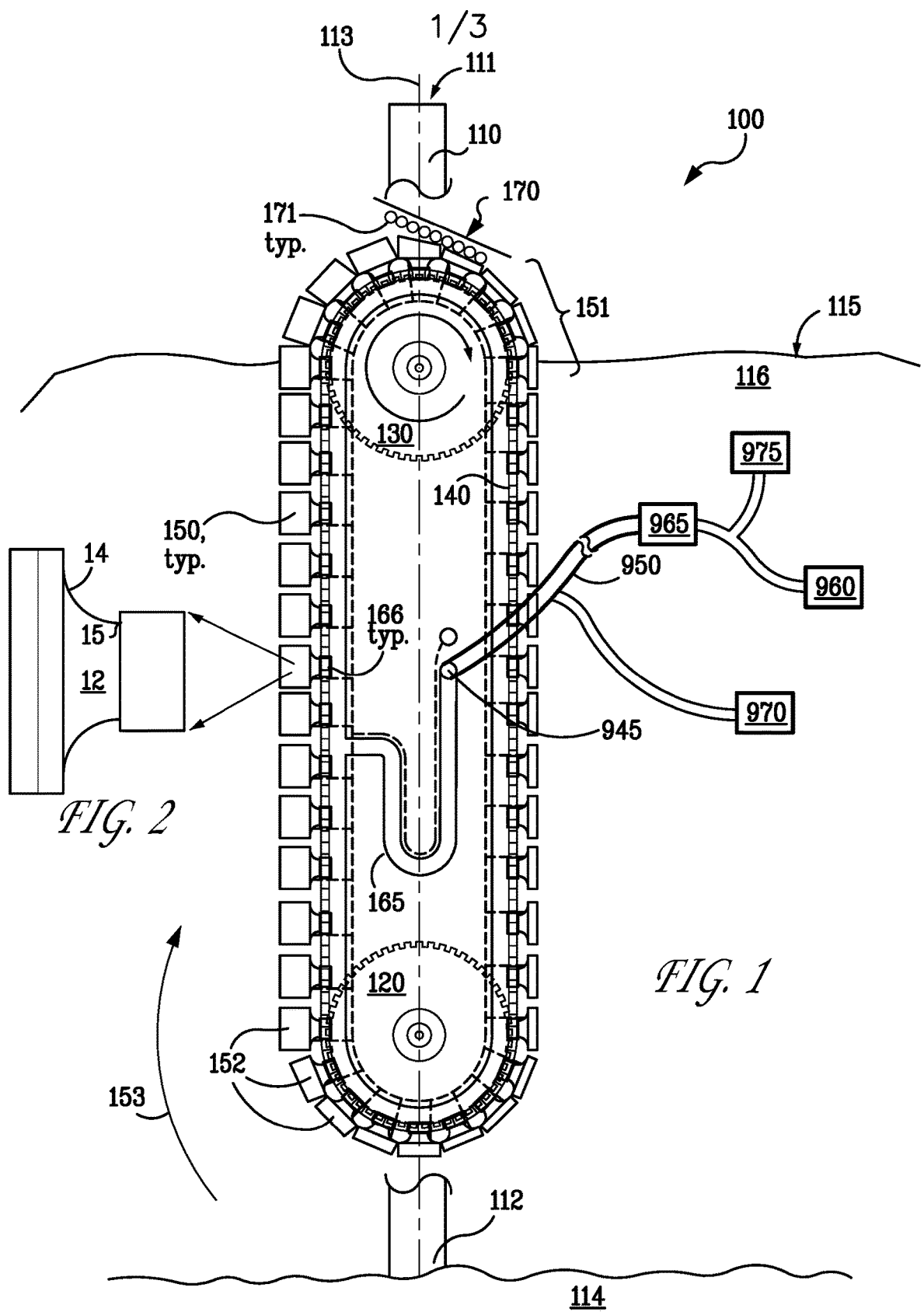
FIG. 1 is an overview of one aspect of the present disclosure.
FIG. 2 is a side view of an airbag according to another aspect of the present disclosure.

Referring now to FIG. 1, a power generation system 100 is shown.

The power generation system 100 includes a support 110 having an upper end 111 and a lower end 112. The support 110 is preferably installed vertically along an axis 113 in the ground 114 below the surface 115 in a body 116 of water. The present invention may include system of trusses and supports as is known in the art to securely affix the system 100 to the surface 115 including sidewalls of a body of water.

In one preferred embodiment, the lower end 112 is configured to be affixed to the ground surface 114 underwater, while the upper end 113 extends above the surface 115 of the body of water 116.

The system 100 further includes a lower gear 120 rotatably affixed proximate to the lower end 112 of the support 110. In one preferred embodiment, the lower gear 120 is fully submerged below the surface 115 of the body of water 116.

The system 100 further includes an upper gear 130 rotatably affixed proximate to the upper end 111 of the support 110. In one preferred embodiment, the upper gear 130 is located proximate to the upper end 110 of support 110 so as to be partially submerged in the body of water 116. In another preferred embodiment, the upper gear 130 is located along support 110 so as to be about half submerged, leaving about half of the upper gear protruding above the surface 115 of the body of water 116.

The power generation system 100 further includes a chain 140 connecting the upper gear 130 and lower gear 120 such that the upper gear 130, lower gear 120, and chain 140 cooperatively rotate along a vertical axis 113 together as a linked system.

The power generation system 100 further includes a series of airbags 150 installed along an outward-facing surface of the chain 140. The series of airbags 150 are pneumatically coupled to an inflation system through an air hose system 165. Each airbag 150 is pneumatically coupled to an air hose through an electric valve 166.

As a general overview of the operation of the power generator 100, the airbags 152 on a first vertical segment of the chain are inflated while underwater, causing the airbags to move upward towards the water surface under buoyancy and rotate the linked system in a clockwise direction 153. Meanwhile, the airbags of segment 151 are being deflated by compression as they rotate up and above the surface of the water and pass under a deflation mechanism 170 and pass under a system of rollers 171. The compressed and deflated airbags then begin a downward track and are submerged back under the surface of the water along a second vertical segment of the chain.

When the deflated airbags pass around and under the lower gear 120, they are inflated again, and their buoyancy forces their rise back to the surface of the water 115. As will be appreciated, this inflation of airbags on one side of the chain 140 while the airbags are deflated on the opposite side of the chain 140 will result in a constant rotational force being applied to the linked system, and will cause the upper gear 130 and lower gear 120 to rotate in a direction 153. This rotational energy may then be harnessed to generate electricity in known manners, such as by a turbine system.

It is contemplated that the system 100 may comprise as many airbags as necessary to generate a desired buoyancy force. The length of the chain 140, and the size and volume of the airbags 150 maybe chosen accordingly.

Referring now to FIG. 2, a side view of another aspect of the present invention is shown. In FIG. 2, a side view of an airbag 150 is shown.

Referring now to FIG. 2, the airbags may be affixed to a chain using brackets 12. The airbags may be affixed to the brackets 12 using bolts 14 (not detailed) and affixed to the chain 13 using bolts 15 (not detailed).

Figure 3:
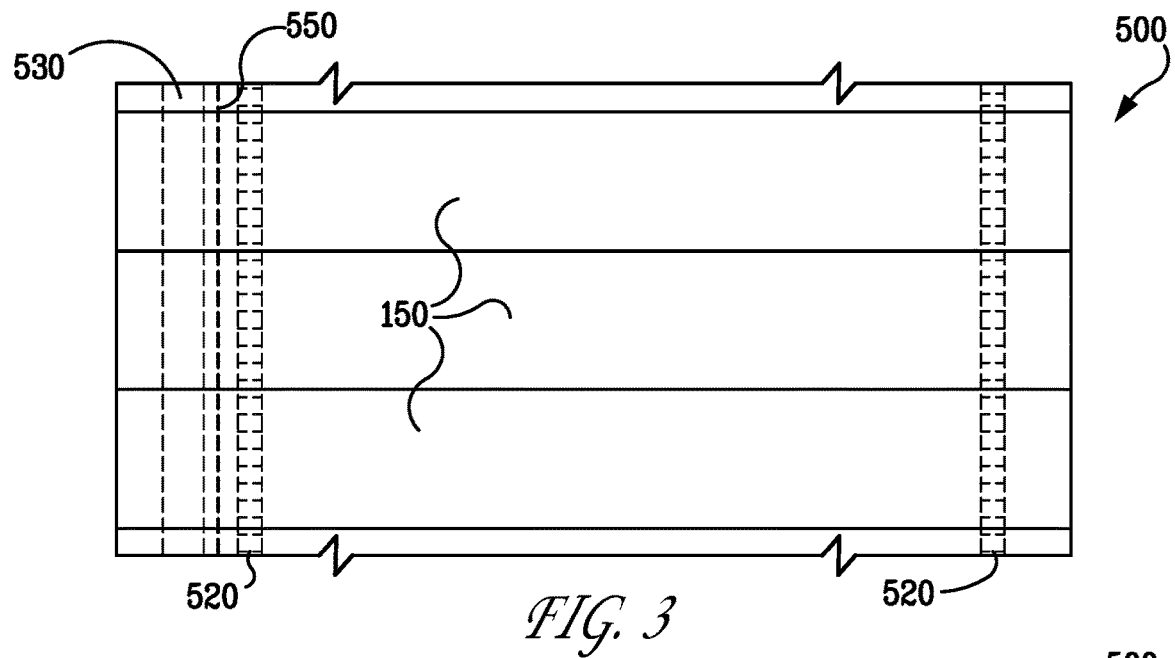
FIGS. 3 and 4 are views of airbags and associated detailed in accordance with another aspect of the present disclosure.

FIG. 3 is a back view of airbags configured in accordance with the teachings of this disclosure, showing the back surface of the airbags 150. FIG. 3 shows a dual-chain configuration to enhance stability.

Figure 5:
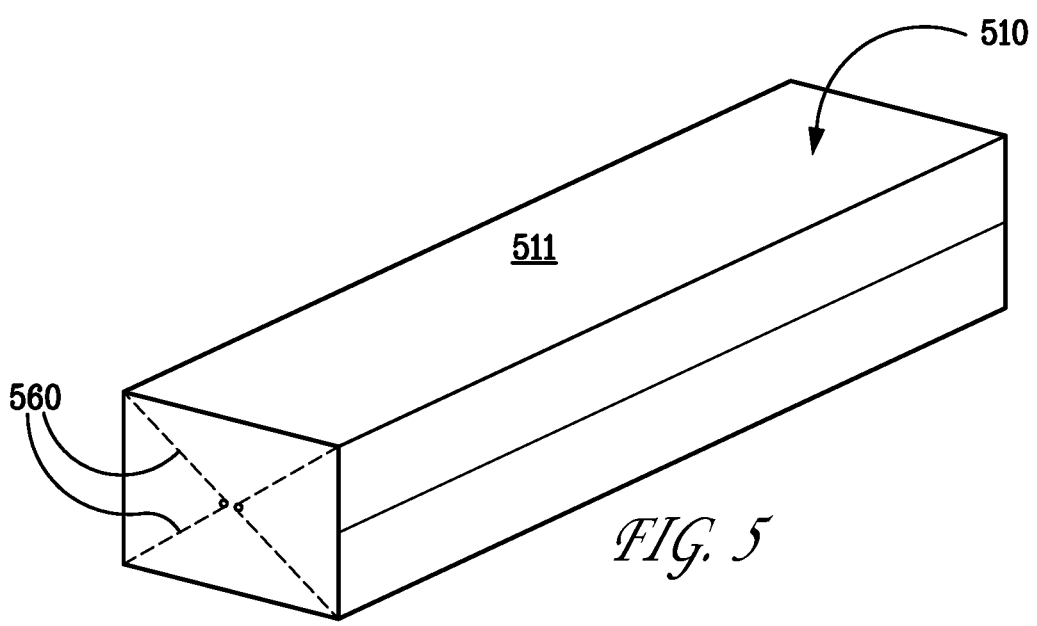
FIGS. 5 and 6 are inflated and deflated views, respectively, of airbags configured according to another aspect of this disclosure.

FIG. 3 shows a front view of yet another aspect of an underwater power generator 500 in accordance with this disclosure. FIG. 5 shows a front view of a series of airbags 150 arranged sequentially and coupled to dual chain 520. Proximate to one side of the airbags 510, air supply hoses 530 are disposed on the back surface of the airbags 510. As can be seen from FIG. 5, it is desired that the airbags be arranged sequentially such that space between the airbags is minimized so as to lessen any turbulence and drag when moving underwater.

Figure 4:
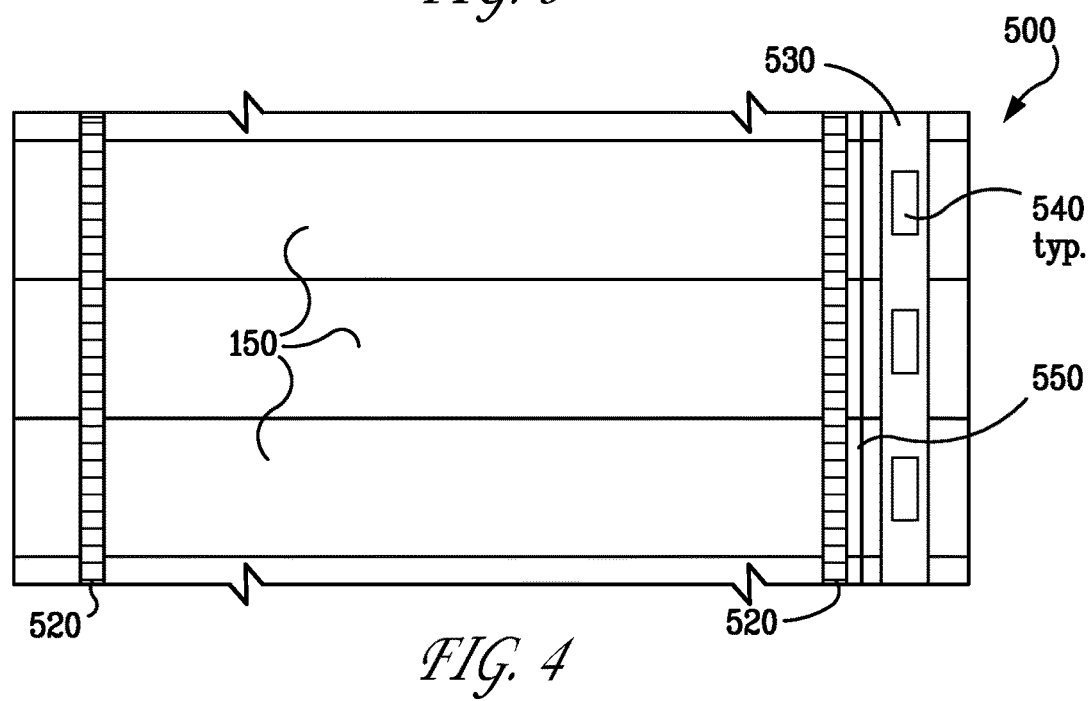
Figure 6:
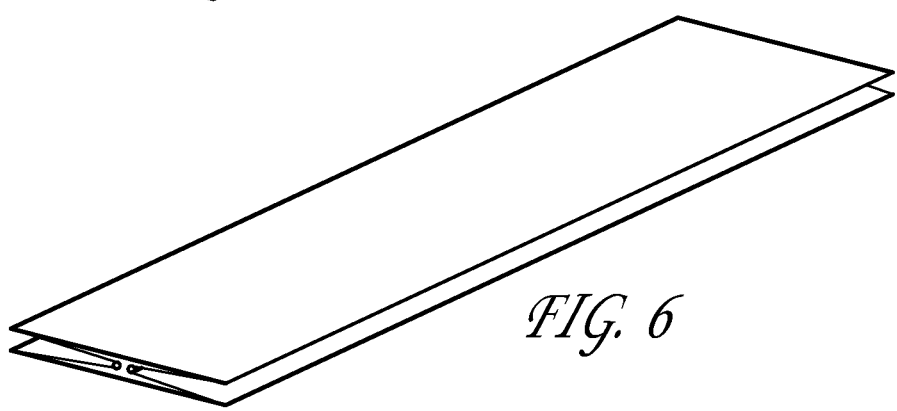

FIG. 4 shows a back view of one aspect of an underwater power generator 500, showing the underside of the airbags 510. FIG. 6 show the airbags 510 arranged edge-to-edge sequentially and coupled to a dual chain 520. FIG. 6 further includes a series of valves 540 corresponding to each airbag 510 for controlling airflow between the airbags 510 and air supply hose 530. The valves may be controlled and powered through an electrical wire 550.

In one aspect of this disclosure, the valves 540 may include a gravity actuated electrical switch, such that when the airbag 510 rotates over the top of the underwater power generator 500, the air valve 540 is opened, allowing for the airbag 510 to be deflated. As the airbag 510 rotates under the bottom of the cycle and the airbag 510 is again inflated, the air valve 540 then closes, and seals the inflated airbag 510 for the upward cycle.

FIGS. 5 and 6 show two views of an inflated and deflated airbag, respectively, configured in accordance with the teachings of this disclosure.

FIGS. 5 and 6 shows the airbag 510 comprising a surface 511, which is preferably rigid and suitable for the affixing to the chain 520 through a series of sprockets (not shown). The airbags of this disclosure are preferably formed from a flexible material, such as a rubber of the type used in tires and inner tubes. The airbags may be formed such that the sides comprise an accordion configuration, wherein the sides are able to be collapsed such that the airbag lays flat, and then re-inflated to full size repeatedly, such as an accordion may be closed and opened repeatedly. Seams 560 may be formed into the airbags surface to aid in this functionality. The rubber material may be affixed to the surface 511 using known means.

In one preferred embodiment, the air bag 510 may comprise a size and dimension as long as approximately 20 feet, 2 feet wide, and 1 foot deep, when inflated.

In yet another preferred embodiment, the airbag 510 may include an inner tube to facilitate inflation, similar to a tire. Referring back now to FIG. 1, air and electrical control circuitry will now be disclosed.

Referring back now to FIG. 1, air and electrical control circuitry will now be disclosed.

Air supply and electrical wiring is shown as a combined cable snake 165, coupled to the airbags as shown and described herein. The snake 165 terminates in a master connector 945, located preferably above the surface of the water 115.

A second snake 950 is coupled to the master connector 945 and provides pneumatic and electrical coupling to a main compressor 960 through regulator 965. Once the system is at pressure, overflow air may be stored in a low-pressure storage unit 970, and high-pressure storage unit 975. Electrical operation may be controlled using electrical control circuitry housed with compressor 960.

A general overview of one aspect of the operation of the underwater power generator 100 will now be described in accordance with the teaching of this disclosure. At startup, the main air compressor 960 will pressurize the air supply hoses through the snakes 165 and 950. The control circuitry is configured to close the air valves 540 (FIG. 2) of the airbags 150 that are on the downward side of the clockwise rotation. As such these airbags will not be inflated.

Conversely, the airbags 150 that are on the upward cycle will be inflated. It is contemplated that the inflated airbags of the system as a whole will achieve a static pressure of Pstatic. Thus, the internal pressure of airbags 150 will also be Pstatic. As the airbags 150 are fully inflated, the system 100 will begin to rotate in a clockwise fashion. In one embodiment, Pstatic may comprise approximately 100 lb/in$^2$.

At the top of the cycle at upper gear 130, the air valves in the airbags will open, and the airbags will rotate up against, and be compressed by, a compression roller system 170 and 171. At this time, air inside the compressed airbags will be compressed out and fed back into the snake 165. The airbags rotating toward the bottom of the cycle will be fully compressed and deflated, having an internal air pressure as close to zero as possible. In one embodiment, magnets (not shown) may be affixed to the rollers 171 and airbags 150. The polarity and orientation of the magnets may be arranged such that the top surface of the airbags is repelled by the magnets in the rollers 171, providing a further compressive force to assist in deflating the airbags as completely as possible.

As the deflated airbags rotate about the lower gear 120, as they begin their upward journey, their respective air valves 540 will open up. These airbags 150 will begin to inflate as they rotate around cycle 153. When the airbags reach Pstatic, the air valves will close. The buoyancy of the inflated airbags 150 will cause the system 100 to rotate, and the cycle described herein will continue and the rotational energy created herein by the system 100 may be used to generate power as described above.

It is contemplated that a regulator 965 may be used to monitor and regulate the static air pressure of the system, and any excess pressure may be bled off into low-pressure air storage unit 970, and fed back in as needed.

While preferred embodiments of the present invention have been shown and described herein, such embodiments are provided by way of example only. Numerous variations, changes, and substitutions will now occur to those skilled in the art without departing from the invention as recited in the claims as amended. It should be understood that various alternatives to the embodiments of the invention described herein may be employed in practicing the invention.

What is claimed is:

1. A power generation system comprising:
   a support having an upper and lower end and configured to be installed vertically in a body of water;
   the lower end configured to be affixed to a ground surface underwater and the upper end extending above the surface of the body of water;
   a lower gear rotatably affixed to the lower end of the support, the lower gear being fully submerged underwater;
   an upper gear rotatably affixed to the upper end of the support, the upper gear being partially submerged in the water;
   a chain connecting the upper gear and lower gear such that the upper gear, lower gear, and chain cooperatively rotate aligned along a vertical axis as a linked system;
   a series of airbags installed along an outward surface of the chain, each of the series of airbags pneumatically coupled to an inflation system; the inflation system being pressurized to a static pressure at startup of the power generation system;
   each of the airbags on a first vertical segment of the chain being inflated by the inflation system while underwater, causing the airbags to move upward towards the water surface under buoyancy and rotate the upper and lower gears of the linked system;

each of the airbags being deflated as they rotate up and above the surface of the water and downward back under the surface of the water along a second vertical segment of the chain, wherein air from the deflated airbags on the second segment is fed back into the inflation system while simultaneously the airbags on the first vertical segment are being inflated by the inflation system resulting in a continuous rotational motion of the upper and lower gears;

wherein the inflation system comprises a first snake cable coupled to each of the airbags and terminated in a master connector and a second snake cable for providing pneumatic coupling between the master connector and a main compressor and regulator; and wherein the rotational motion of the upper and lower gears of the system is used to generate electricity.

2. The power generation system of claim 1, wherein the inflation system maintains a static pressure throughout the rotational motion of the upper and lower gears.

3. The power generation system of claim 1, wherein the combined length of the first and second snake cables is sufficient to support continuous rotational motion of the power generation system.

4. The power generation system of claim 3, wherein the inflation system maintains a static pressure throughout the rotational motion of the upper and lower gears.

* * * * *